May 18, 1965   J. L. HOLLOWELL   3,183,557
CROSSLAPPING METHOD AND APPARATUS
Filed Dec. 20, 1961   6 Sheets-Sheet 1
FIG. I
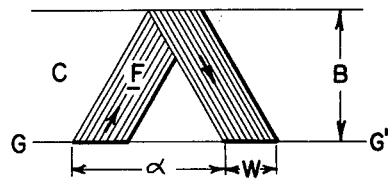
FIG. Ia
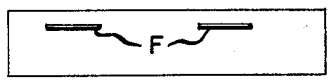
FIG. II
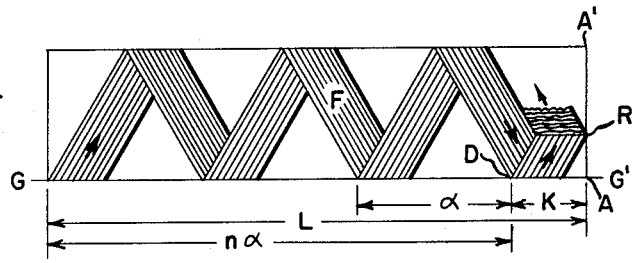
FIG. IIa
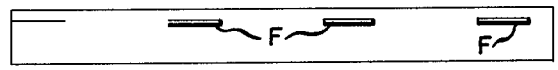
FIG. III
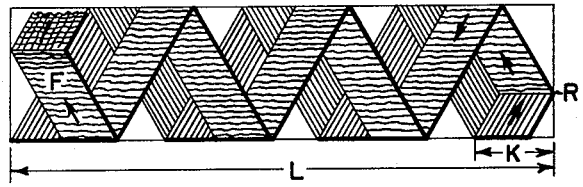
FIG. IIIa
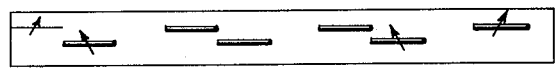
FIG. IV
FIG. IVa
INVENTOR
JOSEPH LEE HOLLOWELL
BY *Paris I. Poindexter*
AGENT May 18, 1965 J. L. HOLLOWELL 3,183,557
CROSSLAPPING METHOD AND APPARATUS
Filed Dec. 20, 1961 6 Sheets-Sheet 2
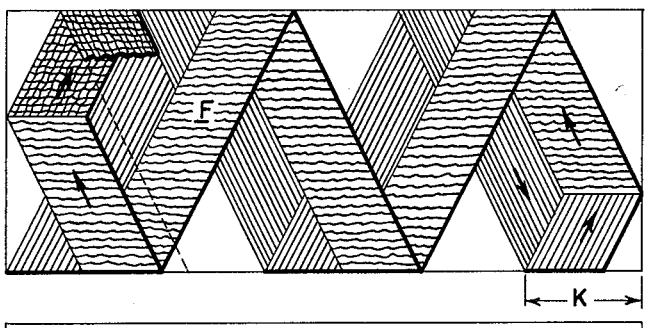
FIG. V
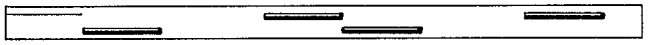
FIG. Va
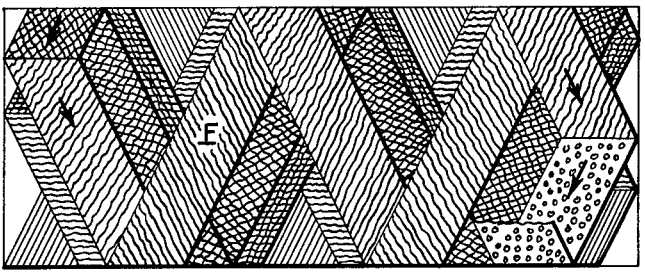
FIG. VI
FIG. VIa
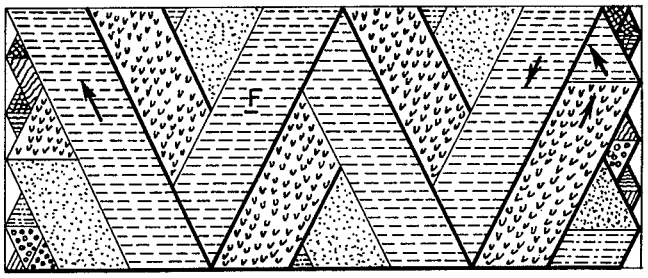
FIG. VII
FIG. VIIa
INVENTOR
JOSEPH LEE HOLLOWELL
BY
AGENT May 18, 1965   J. L. HOLLOWELL   3,183,557
CROSSLAPPING METHOD AND APPARATUS
Filed Dec. 20, 1961   6 Sheets-Sheet 3
FIG. VIII
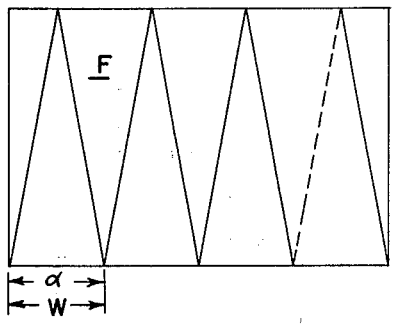
FIG. IX
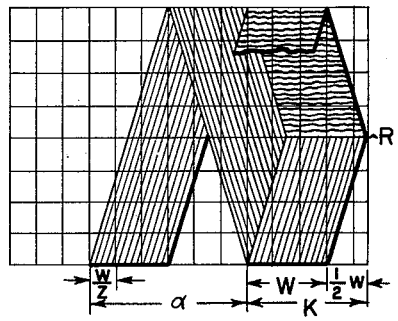
FIG. X
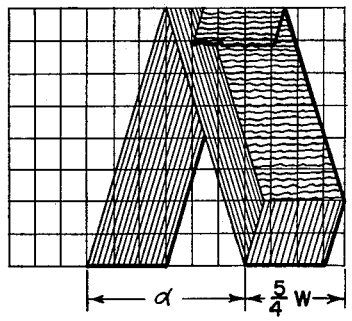
FIG. XI
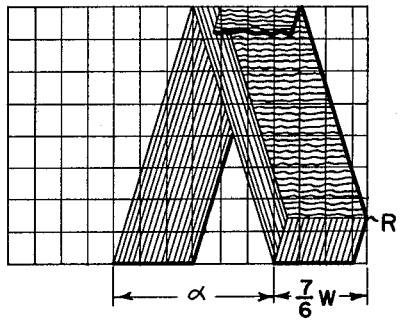
2° SYMMETRY  FIG. XII
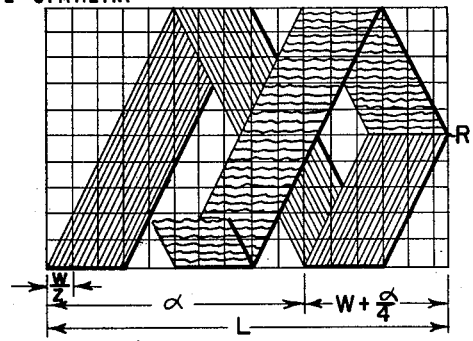
1° SYMMETRY  FIG. XIII
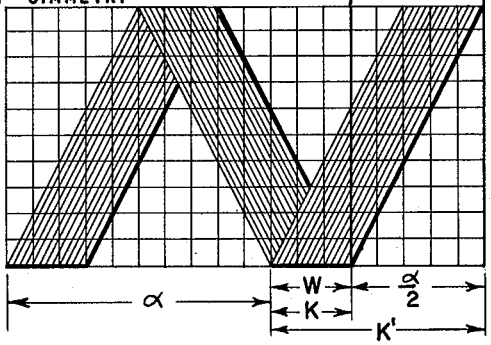
3° SYMMETRY  FIG. XIV
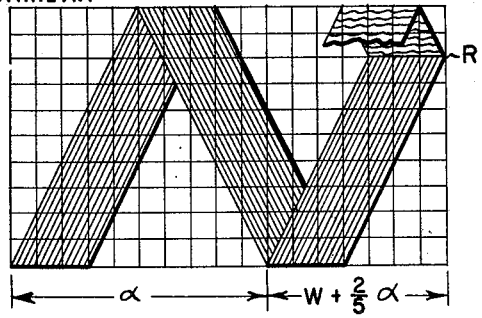
INVENTOR
JOSEPH LEE HOLLOWELL
BY *Paris J. Poindexter*
AGENT FIG. XV
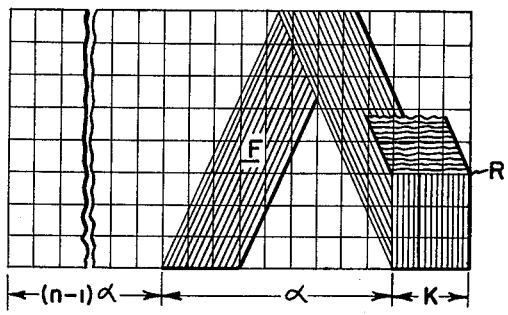
FIG. XVI
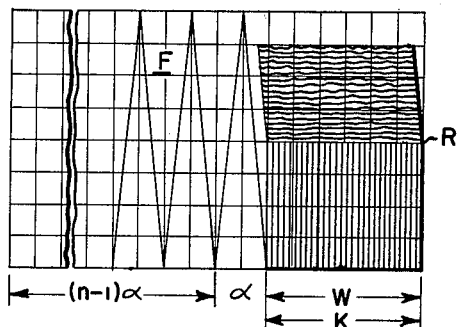
FIG. XVII
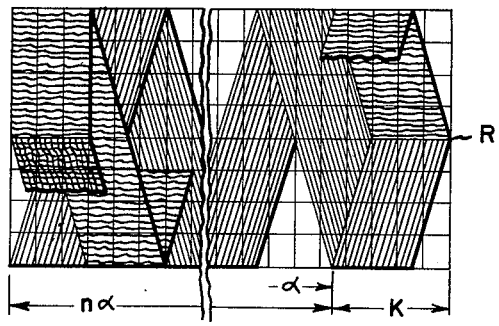
FIG. XVIII
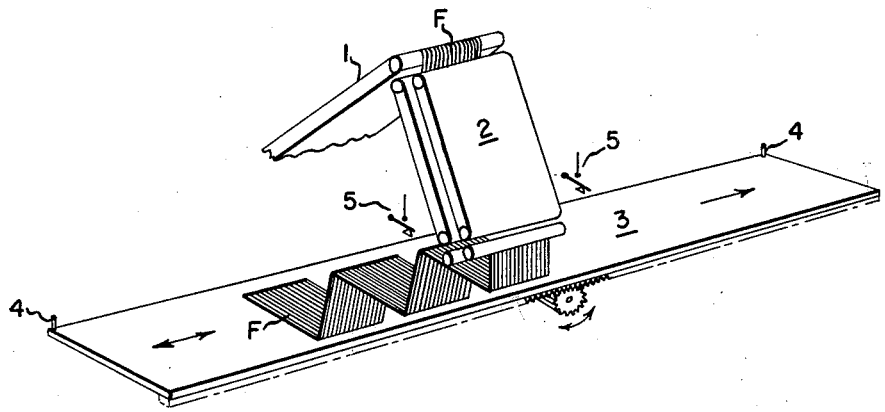
INVENTOR
JOSEPH LEE HOLLOWELL
BY
AGENT

FIG. XIX
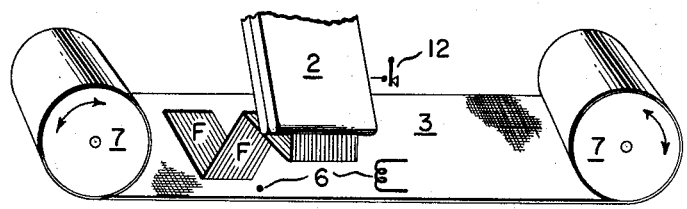
FIG. XX
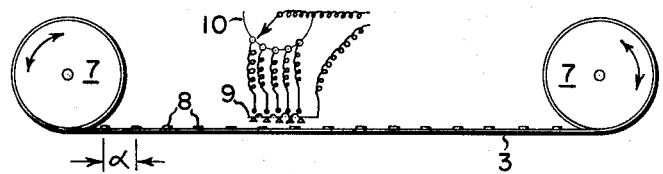
FIG. XXI
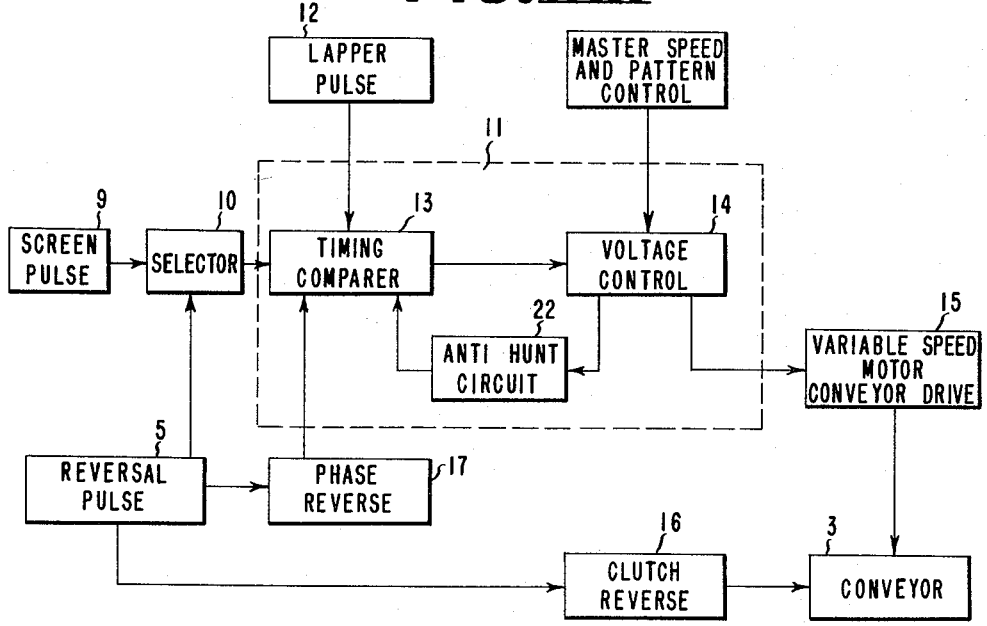
INVENTOR
JOSEPH LEE HOLLOWELL
BY *Paris I. Poindexter*
AGENT May 18, 1965   J. L. HOLLOWELL   3,183,557
CROSSLAPPING METHOD AND APPARATUS
Filed Dec. 20, 1961   6 Sheets-Sheet 6
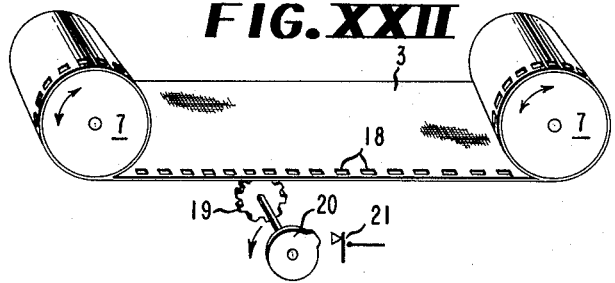
FIG. XXII
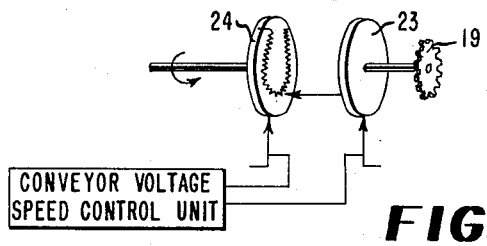
FIG. XXIII
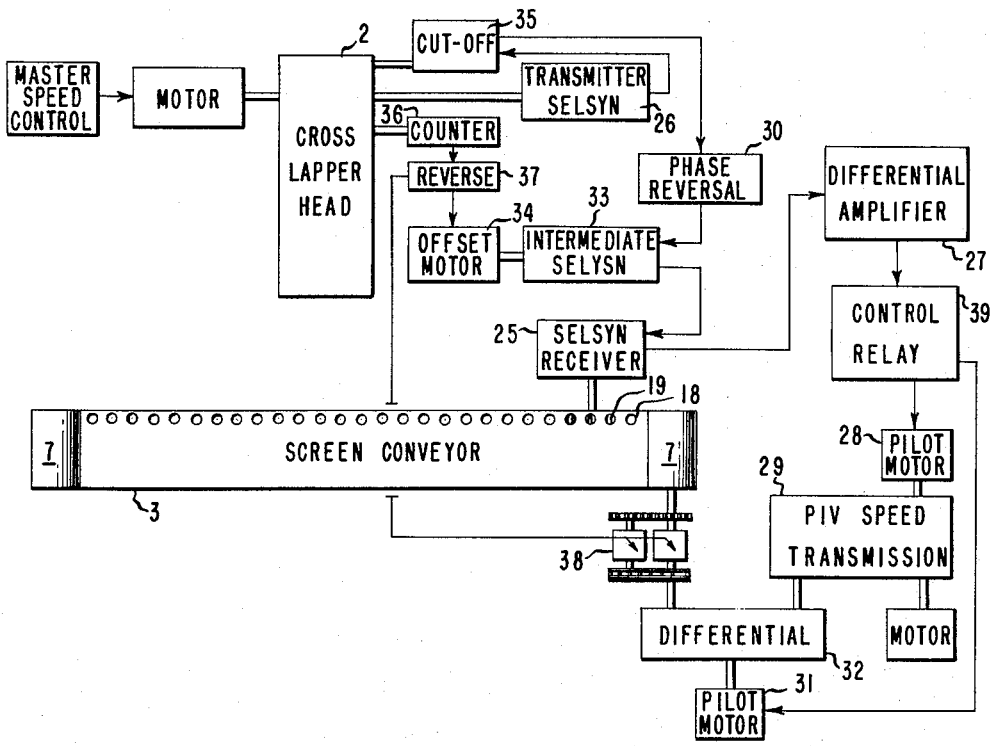
FIG. XXIV
INVENTOR
JOSEPH LEE HOLLOWELL
BY *Paris J. Poindexter*
AGENT United States Patent Office 3,183,557
Patented May 18, 1965

3,183,557
CROSSLAPPING METHOD AND APPARATUS
Joseph Lee Hollowell, Wilmington, Del., assignor to E. I. du Pont de Nemours and Company, Wilmington, Del., a corporation of Delaware
Filed Dec. 20, 1961, Ser. No. 160,803
8 Claims. (Cl. 19—163)

This invention relates to an improved method for making crosslapped webs and apparatus therefor. It particularly relates to a method of precision sequential crosslapping having a controlled pattern that produces multiply structures with a high degree of thickness uniformity. Further, it relates to and has particular advantage in uniform crosslapping of webs having a width relatively narrow compared to the width of the plied structure. Further, it relates to a reciprocating collecting conveyor in a precision crosslapping apparatus that can provide highly uniform crosslapped structures of a wide range of consistent fiber orientations and having substantially any desired length, width and thickness. It further relates to crosslapping apparatus requiring only a single fiber feed source and a single crosslapping mechanism in a small floor space compared to other machines for such range of crosslapped structures.

Because non-woven products are becoming increasingly important in commerce, a much greater degree of precision and uniformity is required than hitherto attainable in random crosslapped products. Both thickness and density must be carefully controlled and a complete absence of streaks, spots and other defects is required in the manufacture of precision felts, gaskets, packings, diaphragms and substrates for fine quality leather replacements and plastic coatings.

Conventionally, crosslapping feeds a web to a crosslapping head which then deposits the web continuously in a zigzag and more-or-less random fashion on a revolving collecting conveyor until a structure of the required thickness has been built up. A close-packed sinuate or zigzag method is normally used to minimize thickness variations. However, this method leaves a series of areas having one or more extra plies than are in adjacent areas, and particularly in thinner structures these are an important source of variation. Attempts to circumvent this problem on existing types of equipment by spreading the sinuate pattern to a more open form and thereby abutting the edges of adjacent parallel plies has been essentially impossible to accomplish in any reliable fashion. First, conventional crosslappers mechanically get out of phase readily with their collecting conveyors in laying down the zigzag pattern. Secondly, conventional conveyors do not prevent the small but serious creep of the crosslapped structure with respect to the conveyor. Either of these failings leave streaks and holes from ply to ply and the discrepancies in thickness uniformity are thereby aggravated and accumulated. Further and more serious, is the fact that where such crosslapping methods have been used, the requirement that the edges abut, has severely handicapped the choice of angle of fiber orientation between adjacent plies. When abutting, the angle is determined solely by the width of the crosslapping web feed and the width of the plied structure being made. Abutting is particularly restrictive on the angle in that situation where the feed web is relatively narrow with respect to the width of the plied product.

The object of this invention is to provide a method for precision crosslapping which provides consistently a high degree of thickness uniformity, with a broad choice of fiber orientation and essentially complete freedom as to the length and width of crosslapped web producible. Another object is to provide structures in which the crosslapped web comprises essentially a series of overlapping and juxtaposed rhombi. A further object is an apparatus which will provide the level of synchronization and control of zigzag pattern to carry out the method, and that at the same time will occupy a minimum of floor space. Further, it is an object to provide a process and an apparatus that will require only one fiber input source and one crosslapping mechanism for substantially any thickness of web and any angle of fiber orientation desired.

It has been discovered that the desired high precision and uniformity of crosslapped products can be obtained by application of an entirely different concept of crosslapping which involves sequential crosslapping. The method of this invention involves basically three unique and cooperating steps not heretofore used in the crosslapping art, which are:

(1) The collecting conveyor is made to reciprocate in certain restricted series of sequences over an exact distance determined by the geometrical nature of zigzag pattern desired.
(2) The speed of the collecting conveyor is correctably synchronized with the speed of the crosslapper head.
(3) The motion of the conveyor at the point of reversal is halted momentarily for a period of time T determined by the nature of the zigzag pattern desired before commencing the return.

These steps and the design of suitable apparatus are more readily understood by reference to the appended drawings and the following detailed description of the apparatus and method. Certain terms and conventions are observed therein to simplify the presentation:

First, it is assumed that the conveyor moves from right to left for the first traverse as illustrated by FIGURE II of the drawing and that in so doing, collects the first sequence or layer of crosslapped web. This sequence is made up of a series of connected inverted V's termed elements as shown in FIGURE I. The first element thus is laid on the left-hand end of a conveyor and the last whole or partial element of that sequence on the right-hand end.

Second, the crosslapper head is assumed to move substantially at right angles to the motion of the conveyor as illustrated by the drawings.

Third, that after having laid the last whole or partial element the conveyor halts momentarily and then reverses direction, returning to the right and collecting the second or next sequence without interruption of the motion of the crosslapper head and continuing thereafter to reverse after each traverse of the designated length of the conveyor.

Fourth, that depending upon the length of the time that the conveyor is halted at the reversal point, either of two distinct modes of operation result:

(a) Continuous Sequential Crosslapping, abbreviated hereafter as CSC;
(b) Delayed Sequential Crosslapping, abbreviated hereafter as DSC.

Fifth, that each pattern is designated by a certain numerical ratio (for example, 3/1, see reference to FIGURE II below) which is hereinafter defined.

In the following drawings, FIGURES I–XVII refer to the types of patterns attainable. FIGURES XVIII–XXIV refer to the apparatus.

FIGURE I shows a single crosslap element of web F collected on conveyor C.

FIGURE I(a) shows a cross-section of the above element taken at the lower edge of the conveyor line GG'.

FIGURE II shows a completed first sequence of a 3/1 pattern by CSC.

FIGURE II(a) shows the cross-section of the above sequence taken at the lower edge of the conveyor along line GG'.

FIGURE III shows a completed second sequence of the 3/1 pattern.

FIGURE III(a) shows the corresponding lower edge cross-section.

FIGURE IV shows the completed third and last sequence of a 3/1 pattern by CSC.

FIGURE IV(a) shows the corresponding lower edge cross-section.

FIGURES V, V(a) show the completion of a second sequence and edge cross-section of a 10/3 CSC pattern.

FIGURES VI, VI(a) show the completion of a fifth sequence and lower edge cross-section of the above 10/3 CSC pattern.

FIGURES VII, VII(a) show the completion of the tenth and last sequence and the corresponding lower edge cross-section of the same 10/3 CSC pattern.

FIGURE VIII shows three elements of a 1/1 pattern.

FIGURE IX shows the final element of the first sequence of a 2/1 pattern.

FIGURE X shows the final element of the first sequence of a 2/2 pattern.

FIGURE XI shows the final element of the first sequence of a 3/2 pattern.

FIGURE XII shows the final element of a symmetrical and incompletable 10/3 CSC pattern where the offset length K (defined hereinafter) has been chosen with a value which illustrates 2° symmetry.

FIGURE XIII shows another incompletable 10/3 CSC pattern where K has been chosen with a value which illustrates 1° symmetry.

FIGURE XIV shows a third and incompletable 10/3 CSC pattern having 3° symmetry.

FIGURE XV shows the resolution of the first sequence of a 10/3 pattern having 1° symmetry by DSC.

FIGURE XVI shows the resolution of the first sequence of a 2/6 pattern having 1° symmetry by DSC.

FIGURE XVII shows the completion of a second sequence of a 2/1 pattern in which DSC is used to stimulate a 2/2 pattern.

FIGURE XVIII shows a simple crosslapper head laying a first sequence on a reciprocating table-type conveyor.

FIGURE XIX is similar to FIGURE XVIII but shows a screen and pair of reversible roll-up drums to replace the reciprocating table.

FIGURE XX shows the layout of the screen sensing portion of a synchronizing CSC unit.

FIGURE XXI shows a schematic layout for a CSC unit adaptable to the equipment of FIGURE XVIII or XIX.

FIGURE XXII shows an alternate to the FIGURE XX screen sensing portion of a synchronizing CSC unit.

FIGURE XXIII shows a rotary comparer for a synchronizing unit.

FIGURE XXIV shows a schematic layout for a combined CSC/DSC system using the equipment of FIGURE XXII.

PATTERN

A crosslapper basically lays down a zigzag conformation of web upon a conveyor belt in successive layers and it is the geometric proportions of this conformation that determine to a large extent the uniformity of the resulting plied structure. Of the almost infinite variety of conformations possible, it has been discovered that only a relatively few have the required attributes of reproducibility, uniformity and controllability to be useful on a practical basis. These specific conformations are herein designated as patterns and they are one of the major elements in the method of this invention. Patterns having the above attributes are denoted by two basic characteristics: (1) they are symmetrical along the longitudinal axis, and (2) they are laid down, using successive, uniformly spaced reversals of the collecting conveyor. Such patterns demand that the crosslapper have a high degree of precision in operation and that speeds of the crosslapper head and collecting conveyor be closely and correctably synchronized. Further, that the mechanical design of the collecting conveyor must be compatible with the requirement for long lengths of crosslapped product in a reproducible, precise and uniform pattern.

These patterns are best described by reference to a group of parameters shown in the appended drawings and used in defining the method of this invention. FIGURE I illustrates within the confines of collecting conveyor C a single crosslap element of feed web F resulting from and laid down by the movement of a crosslapper head through a single cycle at right angles to the leftward movement of the conveyor. This element is marked with the following parameters:

W is the effective width of the feed web at a point where it is folded on itself;

B is the width of the crosslapped structure;

$\alpha$ is the mode length, that is: the distance along the conveyor subtended by one cycle of the crosslapper head 2 (see FIGURE XVIII).

FIGURES II, III and IV show respectively the progressive collection of the first, second and third or last sequences of a 3/1 CSC pattern according to the hereinbefore stated conventions. In these figures, the over-all length of the pattern is L and is determined by the expression:

$$L = n\alpha + K$$

The symbols of the above equation will be understood from the following discussion:

In FIGURE II, after a whole number $n$ of elements is laid down in the distance $n\alpha$, the trailing edge (in this case the left-hand edge as illustrated by the drawing) of the web of width W intersects the lower edge of the pattern line GG' at point "D." Thereafter, the conveyor proceeds an additional distance to the left until the leading edge (i.e., the right-hand edge as illustrated by the drawing) of the web width W intersects a line AA' normal to line GG' which is at a distance K, the unsymmetrical offset from point "D." At line AA' the conveyor halts momentarily and then reverses direction to commence laying the second sequence as shown in FIGURE III. After traversing the length L again to the point of initiation, the conveyor halts and reverses preparatory to laying the third sequence as shown in FIGURE IV. On completion of the third sequence at line AA' a uniform two-ply structure has been deposited and now on the next and third reversal the same 3/1 pattern will be repeated in the next three sequences, building a structure of a total of four plys, etc.

FIGURES II(a), III(a) and IV(a) represent the corresponding cross-section of each structure taken at the lower edge of the pattern along line GG'. These cross-sectional views present the position of the end of each of the elements where the crosslapper head intersects the conveyor edge to show the degree of uniformity attained. Each end is in fact a double layer web F. After the final sequence, as shown in FIGURES IV and IV(a), it will be noted that each web end abuts another so that a uniform two-layer structure with no holes or gaps results.

In FIGURES V–VII and V(a)–VII(a), a similar situation is shown with a more complex pattern—a 10/3 CSC. In FIGURE VII, the final sequence finishes on the left end of the conveyor and a 10-sequence, 6-ply structure results.

Though in FIGURES II–VII the patterns are based on lengths where $L = n\alpha + K$, it is apparent that identical sequences will result if $n$ is 1 and the length is merely $\alpha + K$, i.e., the simplest case. Accordingly, all further discussion is based on patterns having a solitary $\alpha$ component solely to simplify the presentation and not as a limitation of this invention.

The value of $n$ in fact can be at least from 1 to 2000 express or implied, to single $\alpha$ patterns is intended.

Further, though high uniformity is produced in the body of the structure, it should be obvious that the ends of the structure taper irregularly to a one-web thickness as a necessary consequence of the pattern. Some patterns, however, have substantially less taper than others and hence are more efficient to produce.

The concept of an offset K is an important aspect of designating operable CSC patterns. It represents the degree which the sequence of elements following the reversal, must offset the previous sequence, if a fully uniform structure is to result, e.g., FIGURES V–VII. K is a complex quantity varying with each pattern and is selected from two distinct groups of values: The first provides the type of operation termed continuous sequential crosslapping (CSC) in which $$K = \frac{Q'W}{2Z}$$

and the length of the conveyor delay time T (which is expressed by $$T = \frac{mW}{S_c}$$

where $m$ is equal to 0) is zero. Q' and Z are dimensionless numbers to be defined later. The second group of K values requires the type of operation termed delayed sequential crosslapping (DSC) whenever:

$$K = W \pm s\alpha$$

where $s$, the symmetry factor, to be defined later. In DSC operation, the time delay T is expressed by:

$$T = \frac{mW}{ZS_c}$$

whenever $\alpha > W$ $$T = \frac{mW}{pS_c}$$

whenever $\alpha \leq W$ $p$ being an integer from 1 to about 100 and $m$ being 1.

*Continuous sequential crosslapping (CSC)*

By this term is meant the fact that each pattern sequence proceeds at the reversal point directly into the next with minimum time delay in the movement of the conveyor and is graphically shown in the appended FIGURES II–XI. A detailed analysis of these CSC patterns and the meaning of the three dimensionless quantities Z, X and Q used herein follows:

FIGURE IX shows a simple CSC pattern situation. In this, $\alpha = 2W$ and the conveyor reversal is so timed that the web doubles back on itself, exactly filling the spaces of the previous sequence. A complete pattern or layer then is developed in only two sequences, i.e., in two passes of lengths L. A new quantity, the dimensionless number, Z, is used to express the incremental overlap which in this pattern is equal to 1, that is there is no overlap—the web elements abut. Q, another dimensionless number, is the incremental offset and is the number of 2Z fractions of W that the structure extends beyond the length $n\alpha$. In the pattern of FIGURE IX, Q is equal to 3. Thus:

$$K = \frac{QW}{2Z} = \frac{3W}{2}$$

In the pattern of FIGURE X, where the web half laps itself on return, four sequences are required to fill all the gaps, though only a two-ply structure results. The fourth sequence thus completes the layer and leads the crosslapper head naturally into a position such that the next sequence, the fifth, is a duplicate of the first sequence and being super-imposed on it. In this pattern $Z=2$, $\alpha=2W$, and $Q=5$.

In FIGURE XI, one of several possible patterns lapping by thirds is shown. Six sequences are required for completion and a six-ply web results. $Z=3$, $\alpha=2W$ and $Q=7$. In a pattern with lapping by fifths, i.e., $Z=5$, uniformity does not result until a five-ply structure is built. The minimum number of sequences to achieve the number of plies Z for uniformity is obviously proportional to the value $\alpha/W$. This minimum represents a new quantity, a dimensionless number, which is designated X:

$$\alpha = \frac{XW}{Z}$$

In other words, X is the number of Z fractions of W in one lapper cycle or it is the whole number of overlaps $(W/Z)$ into which $\alpha$ can be subdivided. In FIGURES IX, X and XI, X is respectively 2, 4 and 6. The ratio X/Z thus designates the pattern, and along with the value K, is another important aspect of this invention and designates the pattern.

Returning to the quantity Q, in the simpler pattern such as FIGURES IX, X and XI, i.e., where X and Z are either 1 or 2, a complete layer is produced when Q is *any* whole number. However, with structures requiring more complex patterns where X and Z are larger numbers, Q can have only certain integer values if a complete pattern by continuous sequential crosslapping is to be formed. All other integer values produce incomplete patterns with the crosslapper head repeating old sequences and leaving "holes" instead of completing an entire group of sequences or layers before repeating. This situation arises because of an undesired character of such patterns referred to as symmetry. The values of Q that lead to the desired asymmetry and hence complete patterns by CSC, are designated Q' and can be found graphically as shown below:

In FIGURE XII is drawn the pattern of a first sequence of length L and width B and having a unit length of overlap of $$\frac{W}{Z}$$

The independent parameters X and Z selected are respectively 10 and 3. If the width B is divided into X (i.e., 10) equal sections as shown on line AA', any pattern drawn such that the point of reversal "R" coincides with one of these divisions (of AA') that represents a prime factor of X greater than 1, will lead to an incomplete pattern through symmetry. Thus, since are prime factors of 10 larger than 1, are 2 and 5, then any reversal point "R" located on a ½ or a ⅕ division (or multiple thereof) of line AA' will result in an incomplete pattern. Complete patterns for the method of this invention can be produced only when the unsymmetrical offset K, that is $$\frac{Q'W}{2Z}$$

is any multiple of the length $$\frac{W}{2Z}$$

that does not produce coincidence with the fractional divisions of width B that are prime factors of X, e.g., $\frac{1}{10}$, $\frac{3}{10}$, $\frac{7}{10}$, and $\frac{9}{10}$, i.e., where $Q=1, 3, 7$ or 9 respectively. Thus in FIGURE XII, $s=\frac{1}{2}$ and K equals $$\left(W + \frac{\alpha}{2}\right)$$

and Q is 11. An incomplete pattern results, for the "R" point occurs halfway across width B, the position where the prime factor of X is 2, and 2° symmetry exists. Thereby $s$ is defined as any integral fraction in which the denominator is a prime factor of X.

In FIGURE XIII is shown the incomplete pattern that results from K being equal to either W or to $$\frac{\alpha}{2} + W$$

Only the solitary first sequence here will repeat on reversal. The two situations of FIGURE XIII are both said to possess first order (1°) symmetry wherein the prime factors equals X, i.e., 10. In these, Q is respectively 6 and 16.

In FIGURE XIV, 3° symmetry and an incomplete pattern results when the prime factor is 2. Higher orders of symmetry are possible, 5° for example, when X equals 12 (primes being 2, 3, 4, 6 and 12).

Thus, patterns can be readily drawn, designated by the $X/Z$ ratio, X and Z being any integer and the $Q'$ values determined therefrom. In FIGURE XII, 10/3 pattern is shown, FIGURE VIII, a 1/1, FIGURE IX, a 2/1. Other practical patterns are 2/4, 3/4, 4/4, 5/4, 6/4, 7/4, 8/4, 9/4, 10/4, 2/5, 3/5, 4/5, 5/5, 7/5, 8/5, 9/5, 10/5, 11/5, 12/5. Values for X as high as 15 or even 20 are readily attainable especially for structures of unusual width B. Values of Z from 6 to 12 are preferable, though higher values can be used.

The asymmetrical values of Q, i.e., $Q'$, can also be determined from the following tables compiled for representative $X/Z$ patterns. In these tables of X columns, numbers representative of the successive values of Q are arranged sequentially and the columns containing asymmetrical values of Q that yield complete patterns by continuous sequential crosslapping are headed $Q'$. All other columns are headed by degree signs, 1°, 2°, 3°, 4°, etc., signifying that the values of Q thereunder lead to symmetry and thus to incomplete patterns by CSC. Patterns having symmetrical values of Q must be handled by delayed sequential crosslapping and are discussed in a later section.

Though Q can have an integer value, the $Q'$ values occur in a cyclic fashion. The Q numbers in these tables thus form an endless cyclic series, but only the values from $-Z$ to about $+20$ are shown to establish the cycle. Higher $Q'$ values can be determined by extending the tables with additional numbers serially and selecting those falling in "asymmetrical" columns in the manner exemplified. These tables are arranged such that the first value of Q that produces 1° symmetry appears in the upper left-hand corner of each table.

X/Z=2/2   No restrictive symmetry

| $Q'$ | $Q'$ |
|---|---|
| −2 | −1 |
| 0 | +1 |
| +2 | +3 |

X/Z=3/2

| 1° | $Q'$ | $Q'$ |
|---|---|---|
| 1 | 2 | 3 |
| 4 | 5 | 6 |
| 7 | 8 | 9 |

X/Z=4/2

| 1° | $Q'$ | 2° | $Q'$ |
|---|---|---|---|
| 0 | 1 | 2 | 3 |
| 4 | 5 | 6 | 7 |
| 8 | 9 | 10 | 11 |

X/Z=5/2

| 1° | $Q'$ | $Q'$ | $Q'$ | $Q'$ |
|---|---|---|---|---|
| −1 | 0 | 1 | 2 | 3 |
| 4 | 5 | 6 | 7 | 8 |
| 9 | 10 | 11 | 12 | 13 |

X/Z=6/2

| 1° | $Q'$ | $Q'$ | 2° | $Q'$ | $Q'$ |
|---|---|---|---|---|---|
| −2 | −1 | 0 | 1 | 2 | 3 |
| 4 | 5 | 6 | 7 | 8 | 9 |
| 10 | 11 | 12 | 13 | 14 | 15 |

X/Z=7/2

| 1° | $Q'$ | $Q'$ | $Q'$ | $Q'$ | $Q'$ | $Q'$ |
|---|---|---|---|---|---|---|
| −3 | −2 | −1 | 0 | 1 | 2 | 3 |
| 4 | 5 | 6 | 7 | 8 | 9 | 10 |
| 11 | 12 | 13 | 14 | 15 | 16 | 17 |

X/Z=8/2

| 1° | $Q'$ | 3° | $Q'$ | 2° | $Q'$ | 3° | $Q'$ |
|---|---|---|---|---|---|---|---|
| −2 | −1 | 0 | 1 | 2 | 3 | 4 | 5 |
| 6 | 7 | 8 | 9 | 10 | 11 | 12 | 13 |
| 14 | 15 | 16 | 17 | 18 | 19 | 20 | 21 |

X/Z=9/2

| 1° | $Q'$ | $Q'$ | $Q'$ | $Q'$ | $Q'$ | $Q'$ | $Q'$ |
|---|---|---|---|---|---|---|---|
| −1 | 0 | 1 | 2 | 3 | 4 | 5 | 6 | 7 |
| 8 | 9 | 10 | 11 | 12 | 13 | 14 | 15 | 16 |
| 17 | 18 | 19 | 20 | 21 | 22 | 23 | 24 | 25 |

X/Z=10/2

| 1° | $Q'$ | 3° | $Q'$ | 3° | 2° | 3° | $Q'$ | 3° | $Q'$ |
|---|---|---|---|---|---|---|---|---|---|
| −6 | −5 | −4 | −3 | −2 | −1 | 0 | 1 | 2 | 3 |
| 4 | 5 | 6 | 7 | 8 | 9 | 10 | 11 | 12 | 13 |
| 14 | 15 | 16 | 17 | 18 | 19 | 20 | 21 | 22 | 23 |

X/Z=11/2

| 1° | $Q'$ | $Q'$ | $Q'$ | $Q'$ | $Q'$ | $Q'$ | $Q'$ | $Q'$ | $Q'$ | $Q'$ |
|---|---|---|---|---|---|---|---|---|---|---|
| −7 | −6 | −5 | −4 | −3 | −2 | −1 | 0 | 1 | 2 | 3 |
| 4 | 5 | 6 | 7 | 8 | 9 | 10 | 11 | 12 | 13 | 14 |

X/Z=12/2

| 1° | $Q'$ | 4° | 3° | 4° | $Q'$ | 2° | $Q'$ | 4° | 3° | 4° | $Q'$ |
|---|---|---|---|---|---|---|---|---|---|---|---|
| −8 | −7 | −6 | −5 | −4 | −3 | −2 | −1 | 0 | 1 | 2 | 3 |
| 4 | 5 | 6 | 7 | 8 | 9 | 10 | 11 | 12 | 13 | 14 | 15 |

X/Z=13/2

| 1° | $Q'$ | $Q'$ | $Q'$ | $Q'$ | $Q'$ | $Q'$ | $Q'$ | $Q'$ | $Q'$ | $Q'$ | $Q'$ | $Q'$ |
|---|---|---|---|---|---|---|---|---|---|---|---|---|
| −9 | −8 | −7 | −6 | −5 | −4 | −3 | −2 | −1 | 0 | 1 | 2 | 3 |
| 4 | 5 | 6 | 7 | 8 | 9 | 10 | 11 | 12 | 13 | 14 | 15 | 16 |

It will be noted that all odd number values of X produce patterns with only one degree of symmetry. The even number values will have several (or none in the case of $X=2$). Though these tables are also worked out for values of $Z=2$ only, they can be rearranged to apply to any other value of Z by the following procedure:

To the first number in the upper left-hand corner is added twice the difference between the new Z and 2. To convert, for example, the table of 6/2 to a table of 6/4, $(4-2)2$, i.e., 4 is added to each number. Thus, the 6/4 table is:

| 1° | Q' | Q' | 2° | Q' | Q' |
|---|---|---|---|---|---|
| +2 | 3 | 4 | 5 | 6 | 7 |
| 8 | 9 | 10 | 11 | 12 | 13 |
| 14 | 15 | 16 | 17 | 18 | 19 |

Though less easily handled, the desirable Q values form an infinite series for each combination of X and Z where X is an even number and can be determined from formulas, for example:
The 6/4 pattern has $$Q = 3n + \frac{1+(-1)^n}{2}$$

where $n$ is the number of any member of the desired asymmetrical series.
The 10/3 is $$Q = 10n + \frac{1}{6}(2x^3 - 12x^2 + 34x - 6)$$

wherein X is modulo 4 (i.e., the remainder of: $n$ divided by 4).
The 12/5 is $$Q = 3n + \frac{1+(-1)^n}{2} - 4$$

Delayed sequential crosslapping (DSC)

By this term is meant the fact that completion of at least every other pattern sequence is followed at the point of reversal by a short delay period in the motion of the crosslapper. This delay period T varies with the type of pattern and can be used at least on one end of the conveyor and sometimes both ends. It primarily is used for those patterns of 1° or 2° symmetry wherein $$K = W \pm \frac{s\alpha}{4}$$

and $s$ is an integer from 0 to 2. The time delay T required for DSC can be:

$$T = \frac{mW}{ZS_c}$$

when $\alpha > W$ or can be:

$$T = \frac{mW}{pS_c}$$

when $\alpha \leq W$, $p$ being any integer from 1 to 100 and preferably 1 to 20, and $m$ being the integer 1.

In FIGURE XV is shown how the first sequence of a pattern of 1° symmetry in which $Z=2$ is returned with a delay time T:

$$T = \frac{W}{2S_c}$$

After the next pair of sequences, the crosslapper head returns directly to point "R" and another delay of the same length $$\frac{W}{2S_c}$$

is required to continue constant half-lapping, etc. A total of $$\frac{\alpha Z}{W}$$

sequences is required for a complete pattern.

In FIGURE XVI is shown a pattern of 1° symmetry in which $\alpha$ is less than W. The time delay $$\frac{W}{pS_c}$$

in which $p$ is any integer from 1 to the value 4Z but not exceeding 100, is required only at one end of the conveyor, that is, at the end on which the first sequence is completed. However, it can be used effectively at either or both ends. The significance of the value 4Z is that it provides a time delay equal to double the entire width B of the structure thus returning the crosslapper head to the same point of 1° symmetry. Thus, values of $p$ larger than 4Z merely reproduce the pattern sequence from some specific value smaller than 4Z. Values of $p$ larger than 2Z but smaller than 4Z produce a pattern sequence that is a mirror image of that from some specific value smaller than 2Z. These patterns where $p$ equals from 2Z to 4Z are less useful because they yield structures that are slower to produce.

In FIGURE XVII, for patterns of 2° symmetry where "R" is at the halfway mark and $\alpha = 2W$, the delay period can be used at the end where the first sequence is initiated. Almost any length of delay period can be used but is preferably some integral fraction of $B/S_h$ or $W/pS_c$ as in FIGURE XVI. However, where $\alpha$ equals some other value greater than W, the time delay must be equivalent to $$\frac{W}{ZS_c}$$

as in the example of FIGURE XV if a wholly uniform structure is to result in $$\frac{Z\alpha}{W}$$

sequences.

Patterns of higher orders of symmetry than 1° or 2° can be handled by delayed sequential crosslapping, however, they generally, with few exceptions, are complicated, require a programmed delay period rather than one at constant intervals and produce structures not substantially different than by the simpler patterns.

In summation then, the method of this invention which produces a crosslapped fibrous multi-ply non-woven structure of a high degree of thickness uniformity in successive layers of offset sequences, comprises the following steps:

(a) Feeding a fibrous web of uniform width to a crosslapper head;

(b) Initiating crosslapping of said web in a zig-zag pattern to a width B on a collecting conveyor reciprocating through a distance L for each sequence calculated from the expression:

$$L = n\alpha + K$$

wherein:

$n$ is an integer from 1 to 2000
$\alpha$ is the mode length
K is the length of the unsymmetrical offset;

(c) Synchronizing the speed ($S_h$) of said crosslapper head to speed ($S_c$) of said conveyor and collecting said web on the conveyor according to the expression:

$$\frac{S_h}{S_c} = \frac{2B}{\alpha}$$

(d) Halting the conveyor (see FIGURE II) at the point of reversal "R" as the leading edge of the web F intersects the line of reversal AA', said line being normal to the edge of and lying wholly within the plane of said conveyor and located at a distance K from point "D", an intersection of the trailing edge of the web F with the edge of the pattern, as said web traverses the edge of the pattern of width B, on said conveyor, said point "D" being located at a distance $n\alpha$ from the point of initial intersection for that sequence of said trailing edge with the same edge of the conveyor;

(e) Reversing the direction of said conveyor after a time T, T being determined by the expression:

$$T = \frac{mW}{ZS_c} \text{ when } \alpha > W$$

and $$T = \frac{mW}{pS_c} \text{ when } \alpha \leq W$$

wherein:

W is the effective width of the web
Z is an integer from 1 to 30 representing the incremental overlap of successive sequences,
$p$ is any integer from 1 to 100 and $m$ is an integer from 0 to 1 such that:

$m$ equals 1 when $K = W \pm s\alpha$
$s$ being the symmetry factor and
$m$ equals 0 when K is any other value;

(f) thereafter maintaining the synchronization $$\frac{S_h}{S_c}$$

and repeatedly reversing the direction of movement of said conveyor after each traverse of the distance L until a crosslapped structure consisting essentially of a uniform series of overlapping layers of juxtaposed rhombi has been collected of at least Z plies or sequences.

APPARATUS

It has been the longstanding practice to equip crosslappers with collecting conveyors that form an endless belt running in one direction. This arrangement, though adequate for many batt-making operations, is essentially impossible to use where precisely controlled patterns must be laid down. First, the inherent creep of the crosslapped structure along the conveyor surface causes displacement in the patterns and is an important source of non-uniformity. Second, considerable distortion and stretching of the structure occurs wherever the endless belt passes over rolls of even moderate diameter when making the return run. Further, as the thickness of the structure increases, the degree of distortion is accordingly aggravated.

By replacing the conventional uni-directional type conveyor with a reciprocating conveyor, these difficulties are eliminated and a much more precise and uniform mode of operation adapted. Such a reciprocating conveyor not only makes a valuable improvement in conventional random sequential crosslapping, but is primarily adapted to the synchronization needed for the method of this invention. Further, such a reciprocating conveyor, by contrast with the conventional type, is well adapted to making readily, structures of nearly any length or thickness and to compacting them during laydown as well.

The reciprocating conveyor can be any of several different structures which: (1) provide uniform motion substantially at right angles to the motion of the crosslapper head; (2) reciprocate substantially uniformly over a designated distance and at a rate ($S_c$) compared to that ($S_h$) of the head of $$\frac{S_h}{S_c} = \frac{2B}{\alpha}$$

The conveyor is preferably a planar structure placed underneath the crosslapper head and being sufficiently wide to contain the width B of the deposited web F.

This planar structure can be simply a reciprocating table, an endless belt or a belt of finite length wound up on pairs of drums or mandrels having reversible directions of rotation. It can be of solid sheet construction such as metal, rubber or plastic belt, or metal, wooden or plastic table, and the like. It is preferably of open construction primarily because this permits ready air passage when depositing or removing a crosslapped web. Such a conveyor can be made from rods or bars, wire or link mesh, wire screening, woven fabric, perforated sheeting and the like. A high tensile wire screen such as a papermaker's screen is particularly useful.

A reciprocating table-type conveyor 3 is shown in FIGURE XVIII. Mounted on rollers or wheels (not shown) and guided by tracks (not shown), this construction provides a simple, economical unit for preparation of shorter length webs, say up to 20 yards long. The propelling mechanism can be a rack/pinion, screw, cable and winch, or crosshead type such as an endless chain/link/connecting rod that provides a positive linkage of controllable speed so that precise synchronization with the crosslapper head is possible. Alternatively, a continuous slat-type belt conveyor of operating surface length at least equal to 2L can be used.

A preferred method is shown in FIGURE XIX, wherein a high tensile wire screen conveyor 3 supporting crosslapped web F is wrapped up alternately on two revolving drums or mandrels 7. By incorporation of drag brakes and a controlled speed drive applied alternately (not shown), the screen 3 can be reciprocated over the length L, while maintaining both tension on the screen and synchronization with the crosslapper head 2. Size and location of the drums are largely a matter of choice, though drums about 3 feet in diameter located on each side of the crosslapper head and tangential to the plane of the crosslapping area are preferred. The drums may be driven through gears, belts, chains, and opposed clutches or reverse shift gear transmissions or directly by controlled speed electric motors adapted electrically to the required synchronization and reversal (not shown).

Several different means for reciprocating the conveyor 3 besides manual operation can be used. For example, the table, belt or screen can be equipped with a pair of signalling units at each end, e.g., a peg, permanent magnet, light spot, electrically non-conducting spot or a conducting spot located on a non-conducting strip along the edge. Each signalling unit activates as required a switch, sensing coil, photoelectric cell, contact fingers or similar appropriate device at each end of the length L to initiate reversal of the conveyor movement. Similarly, some part of the machine other than the screen, e.g., the mandrels, drive mechanism, etc. that move in concert with the screen can be adapted to activate a reversal unit and measure out the length L. FIGURE XVIII shows a typical installation using a pair of pegs 4 which alternately activate one of a pair of switches 5. These switches in turn are used to operate relays or other power amplification device (not shown) to reverse the motion of the conveyor drive mechanism (not shown). FIGURE XIX shows another means 6 for initiating reversal, using a magnet and sensing coil activating in turn an amplifier (not shown). Alternatively, a counter activated by a preset number of strokes of the crosslapper head 2 similarly can be used.

Crosslapping apparatus to carry out the method of this invention requires, in addition to a reciprocating conveyor 3, a means for sensing the positions of the crosslapper head and the conveyor respectively at any moment, correcting the speed of one of them to bring it into phase or synchronize it with the other according to the preset pattern, thereafter maintaining the synchronization. Further, at the point of reversal, a time delay can be introduced to provide for certain modes of operation, e.g., DSC as has been hereinbefore explained.

To make such synchronization effective, particular attention should be paid to the design of the web-handling means and the drive for the crosslapper head. A crosslapper head 2 as illustrated in FIGURE XVIII of camelback or of horizontal-type construction as shown in U.S. Patents 363,217 or 1,978,355 can be used. However, such a crosslapper head must be both accurately constructed and driven if the required degree of precision in crosslapping is to be achieved. Not only must the parts of the mechanism be precisely machined and assembled and a precision drive provided, but the width of the web must be uniformly maintained and the web F continuously and precisely deposited on the conveyor 3. Air currents, electrostatic effects and mechanical disturbances that distort or displace the web from its designated route are to be avoided. Shields, anti-static units and tilt-rolls where appropriate, are useful for these purposes. Particular attention should be paid to the drive (not shown) of the crosslapper head 2 so that its motion both across the conveyor 3 and at the reversal point is uniform and free of halts or variations. Careful synchronization between the speed which the web F is being fed to the crosslapper head 2 and the speed with which the head traverses the conveyor must be maintained to avoid undue stretching or wrinkling of the web.

Sensing and synchronization can be done in a number of different manners, one of the simplest being one which operates on an intermittent basis. A more precise but also more complex system employs continuous sensing and synchronization.

A general intermittent method can compare the timing of a short electrical pulse triggered by the screen 3 with a reference pulse triggered by the crosslapper 2. The length of time then between pulses determines the amount of speed correction applied to the conveyor drive and the relative timing, i.e., before or after the reference pulse, determines if the correction is to be a slow-down or a speed-up.

One such intermittent method (FIGURES XX and XXI) operates as follows:

A series of trigger elements 8, e.g., bumps or short rods, are spaced at distance $\alpha$ all along the edge of the screen or table 3 opposite from the reversal coil 6. As the conveyor screen 3 moves, the elements 8 activate one of a series of sensing units 9, e.g., a switch, located near the conveyor edge spaced $$\frac{W}{Z}$$

apart and connected by a selector switch 10 to a timing control circuit 11. The pulse from element 8 and a pulse generated by the passage of the crosslapper head 2 across an analogous switch unit 12 are used to operate the respective halves of a dual-opposed stepping switch used as a timing comparer 13 in circuit 11. The net timing signal then advances or sets back this stepping switch 13 to add or subtract resistance in a voltage control circuit 14 of a variable speed motor 15 driving the conveyor 3. This repeatedly corrects the conveyor speed and keeps it in phase with the lapper speed.

When the conveyor 3 has covered the distance L, three relay actions are then simultaneously initiated by the coil 6:

(a) The conveyor drive is reversed (for example, either by a change in polarity of the motor drive, a geared reverse or preferably by use of a pair of electromechanical clutches 16 of opposed rotation as before discussed).

(b) The polarity of the resistance addition or speed control function is reversed by unit 17.

(c) The sensing element 8 of the sequence being completed is electrically replaced by the sensing element 8 of the next sequence by advance of the selector or stepping switch 10.

At this point the cycle is complete and ready to commence the next sequence. FIGURE XXI shows an electromechanical schematic diagram by which the above may be accomplished.

The trigger/sensing element combination 4, 5, 6, 8 and 9 in FIGURES XVIII–XX can be satisfied by a variety of units. For example, a magnet and flux responsive coil 6 or a peg and switch 4 and 5 can be used. A conductive spot in a non-conductive strip along the edge of the screen 3 can be used with a pair of contacts to close a pulsing circuit. Similarly, a light altering spot, i.e., a black or a white spot, activating a photoelectric cell unit can be used. Evenly spaced holes 18 in the edge of the screen 3, FIGURE XXII, with a spot light source can be used to trigger such a unit. In a further modification, in FIGURE XXII, this series of uniformly spaced holes 18 along the edge of the conveyor can be used to engage a sprocket 19. This sprocket in turn drives a cam 20 activating a pulsing unit 21 at a rate equal to the passage of conveyor length $\alpha$. Appropriate damping circuits 22 are desirable in circuit 11 to reduce "hunting." The length of the time interval can also be used via the stepping switch 13 to increase proportionately the rate of speed correction by being constructed with a non-linear or exponential resistance change.

FIGURE XXIII shows still further modification for the timing and control circuit 11, FIGURE XXI, in which the sprocket 19 drives half 23 of a rotary rheostat, the other half 24 being driven at a speed in concert with the crosslapper head 2, but in a constant direction. Such a rheostat comprises a circumferential resistance unit for one half and a rotary single contact for the other half and is connected to the voltage control circuit 14 of a variable speed motor drive 15 for the conveyor 3. Thus, the relative displacement of the two halves by any differential movement determines the voltage to the unit. If the lapper half lags, the voltage is reduced from normal; if it leads, the voltage is increased and if there is no displacement, the voltage remains unchanged from that set by the master speed control. Changes in polarity consistent with the direction of motion of the conveyor are usually required at the reversal point.

The above intermittent sensing is primarily adapted to those types of web patterns requiring continuous sequential crosslapping. However, a time delay for the conveyor, long enough to move the crosslapper head a distance $$\frac{B}{X}$$

can be introduced at one or both reversal points. For patterns having 1° symmetry, the delay is introduced at the end on which is finished the first sequence. For patterns having 2° symmetry, the delay is introduced at the end on which the first sequence commences.

For web patterns where $\alpha$ is equal to or less than W, the time delay can be introduced at both ends of the pattern and further can be equal to $$\frac{W}{ZS_c}$$

or the integral fraction $$\frac{W}{pS_c}$$

in which $p$ is any integer from 1 to 100 but preferably is the number of sequences to be used in the entire crosslapped web structure. Conveniently, delay can be introduced via cutoff relay and timed reset in the conveyor drive circuit triggered by the same mechanism 4, 5 or 6 used elsewhere to reverse the conveyor.

The preferred apparatus is based on a combination continuous and delayed sequential crosslapping method and uses a continuous sensing and synchronization system. A schematic drawing for this is shown in FIGURE XXIV. In this, the conveyor screen 3 is equipped with holes 18 along one edge and a meshing sprocket 19 whcih drives the receiver portion 25 of a differential (a 3-section)

selsyn unit. The crosslapper drive turns the transmitter portion 26 of this unit and the resulting error signal is amplified by a differential amplifier 27 and the output used through relays 39 to run momentarily a motor pilot 28, adjusting a variable speed transmission 29 in the screen drive. Appropriate phase reversal 30 must be used at the end of each sequence to keep the signal to the pilot consistent with the conveyor direction. An additional pilot motor 31 and differential 32 provide rapid speed correction. An intermediate portion 33 of the differential selsyn unit provides the optional pattern offset delay, and is rotated by a separate motor 34 for a few degrees at the end of each sequence. To avoid hunting, a damping circuit is used in the error signal amplifier 27 and a momentary cutoff 35 of the transmitter selsyn 26 circuit is used during crosslapper head reversal until the head returns to normal synchronizing speed. Reversal of the conveyor screen is accomplished by a counter 36 activating a reversing switch 37 and one of a pair of opposed electromagnetic clutches 38 after a preset number of traverses of crosslapper head 2, i.e., the number being the symbol $n$ in the expression $L=n\alpha$.

This type of apparatus is particularly useful since it can be adapted to nearly all types of patterns. Not only can it be used for the delayed sequential type of patterns having one or two degrees of symmetry, but the intermediate selsyn can remain stationary so that patterns of the continuous sequential type can be crosslapped. It is particularly useful since pattern overlap within 1/8" accuracy can readily be obtained.

Various refinements of the above general types of pattern control systems can be made to adapt it to differing crosslapper and conveyor mechanisms without departing from the scope of this invention.

For example, in using a horizontal crosslapper mechanism, a pair of electromagnetic clutches can be used alternately to rotate the transmitter selsyn unit in a constant direction. Preferably, the transmitter selsyn is geared to be driven for 1/2 revolution per traverse (B) of the crosslapper head and is accordingly triggered for the necessary phase reversal at the end of each traverse. Other appropriate mechanisms are desirable as adjuncts to provide accurate tracking and windup of the screen and torqueless tension on the screen.

Thus, the apparatus for the preferred embodiment of this invention comprises seven cooperating functions and an optional eighth function:

(1) A means for introducing a feed web uniformly to a crosslapper head;
(2) A means to drive said head to deposit and crosslap said feed web in a uniform zigzag pattern;
(3) A conveyor adapted to collect said crosslapped web;
(4) A means to repeatedly reciprocate said conveyor at substantially right angles to the motion of the crosslapper head and over a uniform preset distance;
(5) A means for generating a signal whose nature is determined by the position of said crosslapper head at any point in its cycle;
(6) A means for generating another signal whose nature is determined by the longitudinal position of said conveyor at any point in its cycle;
(7) A means for automatically comparing said signals and therefrom synchronizing the relative speed of the crosslapping means with the speed of the conveyor;
(8) A means to introduce an offset delay in said conveyor movement at the point of reversal.

I claim:
1. A method for crosslapping a fibrous web in successive layers of offset sequences which comprises:
   (a) feeding a fibrous web of uniform width to a crosslapper head;
   (b) initiating crosslapping of said web in a zigzag pattern to a width B on a collecting conveyor, said conveyor reciprocating through a distance L for each sequence according to the expression:

$$L = n\alpha + K$$

wherein:
   $n$ is an integer from 1 to 2000
   $\alpha$ is the mode length
   K is the unsymmetrical offset;
   (c) synchronizing the speed ($S_h$) of the crosslapper head to speed ($S_c$) of the conveyor and collecting said web on the conveyor according to the expression:

$$\frac{S_h}{S_c} = \frac{2B}{\alpha}$$

(d) halting the conveyor at the point of reversal "R" as the leading edge of the web F intersects the line of reversal AA', said line being normal to the edge of and lying wholly within the plane of said conveyor and located at a distance K, from point "D," an intersection of the trailing edge of the web F as said web traverses the edge of the pattern of width B on the conveyor, said point "D" being located at a distance $n\alpha$ from the point of initial intersection for that sequence of the trailing edge of the web with the same edge of the conveyor;
   (e) reversing the direction of said conveyor after a time T, T being determined by the expressions:

$$T = \frac{mW}{ZS_c} \text{ when } \alpha > W$$

and $$T = \frac{mW}{pS_c} \text{ when } \alpha \leq W$$

wherein:
   W is the effective width of the web,
   Z is an integer from 1 to 30 representing the incremental overlap of successive sequences,
   $p$ is any integer from 1 to 100,
   $m$ being an integer from 0 to 1 such that:
     $m=1$ when $K=W\pm s\alpha$
     wherein $s$ is the symmetry factor and
     $m=0$ for all other values of K;
   (f) thereafter maintaining the synchronization $$\frac{S_h}{S_c}$$

and repeatedly reversing the direction of movement of said conveyor after each traverse of said distance L, until a crosslapped structure consisting essentially of a uniform series of overlapping layers of juxtaposed rhombi has been collected of at least Z plies or sequences.

2. The method of claim 1 where in steps (b) and (e) $\alpha$ is larger than W, K is equal to $$\frac{Q'W}{2Z}$$

Q' is the incremental offset expressed as a whole number,
$m$ is 0 and
T is 0.

3. The method of claim 1 wherein step (e) has the following relationship:
$\alpha$ is not greater than W,
K is equal to $W \pm s\alpha$
$s$ is the symmetry factor,
$m$ is 1
and $$T = \frac{W}{pS_c} \text{ where}$$

$p$ is an integer from 1 to 20.

4. A crosslapping apparatus comprising:
   (a) a crosslapper head;
   (b) means to feed a web to the crosslapper head;

(c) a collecting conveyor to receive said web from said head;

(d) means to reciprocate said head at substantially right angles to said conveyor;

(e) means to repeatedly reciprocate said conveyor at substantially right angles to the motion of the crosslapper head and over a uniform pre-set distance to collect said web; and (f) means to synchronize the motions of said crosslapper head and said collecting conveyor so that the web is deposited on the conveyor in a uniform zig-zag pattern.

5. The apparatus of claim 4 in which the reciprocating conveyor is a flexible belt mounted between and attached to a pair of spaced-apart parallel rotating members adapted to wind up said belt.

6. The apparatus of claim 4 in which the reciprocating conveyor is a substantially rigid table mounted to be driven in alternate directions substantially at right angles to the motion of said crosslapper head.

7. In a crosslapping apparatus comprising means to feed a web to a crosslapper head and means to drive said head to deposit said web in a uniform zigzag pattern on a conveyor, the improvement which comprises:

(a) means to repeatedly reciprocate the conveyor over a predetermined distance;

(b) means for generating a signal the nature of which is determined by the position of said crosslapper head at any point in its cycle;

(c) means for generating another signal the nature of which is determined by the longitudinal position of said conveyor at any point in its cycle;

(d) means for automatically comparing said signals and therefrom synchronizing the relative speed of the crosslapper head with the speed of the conveyor.

8. A crosslapping apparatus of claim 7 which includes additionally means to introduce an offset delay in said conveyor movement at a point of reversal.

References Cited by the Examiner

UNITED STATES PATENTS

| | | | |
|---|---|---|---|
| 1,517,945 | 12/24 | Bokum et al. | 19—163 |
| 2,428,709 | 10/47 | Hlavaty | 19—163 |
| 2,434,887 | 1/48 | Repass et al. | 19—161 |

RUSSELL C. MADER, *Primary Examiner.*

MERVIN STEIN, DONALD W. PARKER, *Examiners.*